(12) United States Patent
Talamonti et al.

(10) Patent No.: US 11,909,444 B2
(45) Date of Patent: Feb. 20, 2024

(54) METHOD FOR AN ALL FIBER OPTIC, POLARIZATION INSENSITIVE, ETALON BASED OPTICAL RECEIVER FOR COHERENT SIGNALS

(71) Applicant: RAYTHEON COMPANY, Waltham, MA (US)

(72) Inventors: James Talamonti, McLean, VA (US); Andrew Kowalevicz, Arlington, VA (US); Gary M. Graceffo, Burke, VA (US); Benjamin P. Dolgin, Alexandria, VA (US)

(73) Assignee: RAYTHEON COMPANY, Waltham, MA (US)

( * ) Notice: Subject to any disclaimer, the term of this patent is extended or adjusted under 35 U.S.C. 154(b) by 18 days.

(21) Appl. No.: 17/670,119

(22) Filed: Feb. 11, 2022

(65) Prior Publication Data

US 2023/0261748 A1    Aug. 17, 2023

(51) Int. Cl.
*H04B 10/2581* (2013.01)
*H04B 10/67* (2013.01)
*H04B 10/071* (2013.01)

(52) U.S. Cl.
CPC ....... *H04B 10/2581* (2013.01); *H04B 10/071* (2013.01); *H04B 10/67* (2013.01)

(58) Field of Classification Search
CPC ... H04B 10/2581; H04B 10/071; H04B 10/67
(Continued)

(56) References Cited

U.S. PATENT DOCUMENTS 5,907,403 A * 5/1999 Andrews ................. G01D 5/266
356/35.5
8,478,384 B2 * 7/2013 Schmitt ............. A61B 5/02007
356/497
(Continued)

FOREIGN PATENT DOCUMENTS

CN    105092536 A  * 11/2015
CN    105092536 A    11/2015
(Continued)

OTHER PUBLICATIONS

DKPhotonics optical passive component: "1310/1550nm 3 port Multimode Optical Circulator" Sep. 2021 (Year: 2021).*
(Continued)

*Primary Examiner* — Abbas H Alagheband
(74) *Attorney, Agent, or Firm* — Lando & Anastasi, LLP

(57) ABSTRACT

An optical signal receivers, systems including the optical signal receivers, and methods of operating the same include a multimode fiber circulator including a first port, a second port, and a third port, a first multimode fiber cable coupled to the first port and having an input configured to receive a complex modulated optical signal and provide the complex modulated optical signal to the first port of the multimode fiber circulator, a second multimode fiber cable including a low Q optical resonator coupled to the second port of the multimode fiber circulator that is configured to receive the complex modulated optical signal from the second port of the multimode circulator, and a third multimode fiber cable coupled to the third port of the multimode fiber circulator that is configured to receive a reflected optical signal from the third port of the multimode circulator, the reflected optical signal being reflected from the low Q optical resonator.

18 Claims, 7 Drawing Sheets

(58) Field of Classification Search
USPC .......................................................... 398/28
See application file for complete search history.

(56) References Cited

U.S. PATENT DOCUMENTS

| | | | |
|---|---|---|---|
| 8,971,709 B2* | 3/2015 | Liu | H04B 10/506 398/67 |
| 9,018,575 B2 | 4/2015 | Kowalevicz et al. | |
| 9,165,963 B2 | 10/2015 | Kowalevicz et al. | |
| 9,171,219 B2 | 10/2015 | Kowalevicz | |
| 9,323,034 B2 | 4/2016 | Dolgin | |
| 9,400,414 B2 | 7/2016 | Kowalevicz | |
| 9,451,185 B2 | 9/2016 | Dolgin et al. | |
| 9,503,660 B2 | 11/2016 | Kowalevicz et al. | |
| 9,535,245 B1 | 1/2017 | Kowalevicz | |
| 9,538,096 B2 | 1/2017 | Dolgin | |
| 9,887,779 B2* | 2/2018 | Kowalevicz | H04B 10/50572 |
| 9,973,281 B2 | 5/2018 | Kowalevicz et al. | |
| 10,164,765 B2 | 12/2018 | Dolgin et al. | |
| 10,177,856 B2 | 1/2019 | Kowalevicz et al. | |
| 10,205,526 B2 | 2/2019 | Kowalevicz | |
| 10,225,020 B2 | 3/2019 | Dolgin et al. | |
| 10,243,670 B2 | 3/2019 | Kowalevicz et al. | |
| 10,243,673 B2 | 3/2019 | Dolgin et al. | |
| 10,250,292 B2 | 4/2019 | Graceffo et al. | |
| 10,256,917 B2 | 4/2019 | Dolgin et al. | |
| 10,305,602 B2 | 5/2019 | Dolgin et al. | |
| 10,313,022 B2 | 6/2019 | Dolgin et al. | |
| 10,340,965 B2 | 7/2019 | Dolgin et al. | |
| 10,374,743 B2 | 8/2019 | Dolgin et al. | |
| 10,378,880 B2 | 8/2019 | Dolgin et al. | |
| 10,498,464 B2 | 12/2019 | Graceffo et al. | |
| 10,530,494 B2 | 1/2020 | Dolgin et al. | |
| 10,554,306 B1 | 2/2020 | Graceffo et al. | |
| 10,571,774 B2 | 2/2020 | Graceffo et al. | |
| 10,637,580 B2 | 4/2020 | Dolgin et al. | |
| 10,686,533 B2* | 6/2020 | Dolgin | H04B 10/676 |
| 10,714,251 B2 | 7/2020 | Dolgin et al. | |
| 10,826,603 B1* | 11/2020 | Kowalevicz | H04B 10/07955 |
| 10,924,189 B2 | 2/2021 | Kowalevicz et al. | |
| 11,012,160 B2 | 5/2021 | Kowalevicz et al. | |
| 11,101,896 B2 | 8/2021 | Kowalevicz et al. | |
| 11,133,873 B1 | 9/2021 | Kowalevicz et al. | |
| 11,159,244 B2 | 10/2021 | Graceffo et al. | |
| 11,159,245 B2 | 10/2021 | Kowalevicz et al. | |
| 2005/0036534 A1* | 2/2005 | Baney | H01S 3/08004 372/98 |
| 2006/0029111 A1* | 2/2006 | Liu | H01S 3/06708 372/6 |
| 2009/0038794 A1* | 2/2009 | Yamate | E21B 47/135 166/254.2 |
| 2010/0172649 A1* | 7/2010 | Graves | H04B 10/1123 398/118 |
| 2011/0215344 A1* | 9/2011 | Dardy | H01L 29/66242 257/83 |
| 2014/0299751 A1* | 10/2014 | Tang | B82Y 20/00 385/14 |
| 2018/0136036 A1* | 5/2018 | Galtarossa | G01H 9/004 |
| 2019/0280780 A1* | 9/2019 | Graceffo | H04B 10/676 |
| 2019/0305855 A1 | 10/2019 | Dolgin et al. | |
| 2019/0319714 A1 | 10/2019 | Kowalevicz et al. | |
| 2020/0136727 A1 | 4/2020 | Graceffo et al. | |
| 2020/0371328 A1 | 11/2020 | Kowalevicz et al. | |
| 2020/0403709 A1 | 12/2020 | Graceffo et al. | |
| 2020/0409189 A1 | 12/2020 | Graceffo et al. | |
| 2021/0006336 A1 | 1/2021 | Kowalevicz et al. | |
| 2021/0021351 A1* | 1/2021 | Kowalevicz | H04B 10/5561 |
| 2021/0021449 A1 | 1/2021 | Graceffo et al. | |
| 2021/0041515 A1 | 2/2021 | Dolgin | |
| 2021/0099232 A1 | 4/2021 | Graceffo et al. | |
| 2021/0099234 A1 | 4/2021 | Graceffo et al. | |
| 2021/0105073 A1 | 4/2021 | Graceffo et al. | |
| 2021/0126715 A1 | 4/2021 | Graceffo et al. | |
| 2021/0314071 A1 | 10/2021 | Graceffo et al. | |
| 2022/0014276 A1 | 1/2022 | Kowalevicz et al. | |
| 2022/0166613 A1* | 5/2022 | Cruz | H04L 9/0838 |

FOREIGN PATENT DOCUMENTS

| | | | | |
|---|---|---|---|---|
| CN | 105334519 A | * | 2/2016 | |
| EP | 2521289 A1 | | 11/2012 | |
| WO | 2021127740 A1 | | 7/2021 | |
| WO | WO-2021127740 A1 | * | 7/2021 | ........... G01B 9/0201 |

OTHER PUBLICATIONS

International Search Report and Written Opinion in International Patent Application No. PCT/US2021/041055 dated Nov. 3, 2021.
Ruege, A. C. & Reano, R. M., "Multimode Waveguides Coupled to Single Mode Ring Resonators," Journal of Lightwave Technology, IEEE, (2009), vol. 27, No. 12, pp. 2035-2043.
Thorlabs. "Single Mode Fiber Optic Circulators." Oct. 30, 2020, https://web.archive.org/web/20201030060037/https://www.thorlabs.com/newgrouppage9.cfm?objectgroup_id=373.
International Search Report and Written Opinion of PCT application PCT/US2022/053710 dated May 8, 2023.
DKPhotonics optical passive component: "1310/1550nm 3 port Multirnode Optical Circulator" Sep. 2021 (Year: 2021).

* cited by examiner

METHOD FOR AN ALL FIBER OPTIC, POLARIZATION INSENSITIVE, ETALON BASED OPTICAL RECEIVER FOR COHERENT SIGNALS

BACKGROUND

Light waves may be made to carry information by modulating a light source, often a laser source, to change various properties of the light, such as its amplitude, phase, frequency, wavelength, etc. The light waves may be in the visible spectral band, the infrared spectral band, or another region of the electromagnetic spectrum. Optical receivers receive the light waves and measure properties or variations of the light wave, such as the amplitude, phase transitions, and the like, from which the underlying signal and the information may be recovered.

Phase modulation of light signals may convey useful information. Information encoded in phase modulation may include transmitted communication data, or may include other information such as information about the source of the optical signal, interaction of the optical signal with an object, the optical channel through which the optical signal traveled, and/or objects with which it interacted. Compared to typical amplitude modulation receivers, phase modulation receivers can be significantly more complex, requiring precision optics, local oscillators, Fiber Bragg Gratings (FBG), and/or delay line interferometers (DLI), etc.

A receiver for modulated light waves should collect signal from a large enough area that the acquired signal power is high enough for accurate detection. Conventionally, a telescope may be aimed at the light source and the cross-sectional area of the telescope, or aperture, may determine how much signal power is collected and concentrated (e.g., focused) at a receiver. When such light is phase modulated, optimal reception occurs if all the light rays (across the cross-section of the telescope) arrive at the detector in unison as a single wavefront, maintaining alignment of the original phase relationships of the light rays. Wavefront correction may be required in conventional light-focusing systems, e.g., if the light rays have propagated through varying media along the way, or were skewed, delayed, aberrated, or the like, as is typical for light waves traveling some distance through the atmosphere. Such systems may use adaptive optics to attempt to correct the light rays to their original phase relationships, but such systems are complex, fragile, and costly.

Optical signals with coherent/complex modulation have traditionally required single-mode fiber for optical transport and demodulation purposes. This limits receiver architecture flexibility and establishes a requirement to use equipment with precision tolerances that increase costs. In certain other applications, such as free-space optical communication, additional hardware is also needed to meet this demand.

To transport complex optical signals in any non-line-of-sight application has required single-mode optical fiber. This requirement is met in two ways. For fiber-based communication, the signal is generally generated and maintained in single mode fiber from transmitter to receiver. In the case that the signal is launched into free space, the wavefront is maintained to allow for efficient coupling back into the small single mode fiber diameter needed for single mode propagation. For truly free-space communication systems, where wavefront distortion occurs, adaptive optics systems have been used at the collection aperture. Adaptive optic systems correct for aberrations of the beam and allow for efficient coupling to single mode fiber for transport and demodulation. Both approaches limit the design of the receiver and/or add cost/complexity to the systems.

SUMMARY

Aspects and embodiments are directed to an optical signal receiver comprising a multimode fiber circulator including a first port, a second port, and a third port, a first multimode fiber cable coupled to the first port and having an input configured to receive a complex modulated optical signal and provide the complex modulated optical signal to the first port of the multimode fiber circulator, a second multimode fiber cable including a low Q optical resonator coupled to the second port of the multimode fiber circulator that is configured to receive the complex modulated optical signal from the second port of the multimode circulator, and a third multimode fiber cable coupled to the third port of the multimode fiber circulator that is configured to receive a reflected optical signal from the third port of the multimode circulator, the reflected optical signal being reflected from the low Q optical resonator.

In one example, the low Q optical resonator is a Fabry-Perot interferometer. In certain examples, the Fabry-Perot interferometer is an in-line etalon. At least one example includes the in-line etalon fabricated as part of the second multimode fiber cable. In certain examples, the in-line etalon is optically bonded to the second multimode fiber cable.

In another example, the optical signal receiver further comprises collimating optics coupled to the input of the first multimode fiber cable. In certain examples, the collimating optics include one or more micro lenses.

In one example, the complex modulated optical signal is received at a data rate of about 10 Gb/s and the low Q optical resonator has a Q factor less than 10.

In another example, the low Q optical resonator is configured to receive the complex modulated optical signal having a predetermined data rate and one or more symbols each having a predetermined length, wherein the predetermined length is larger than a decay time of the complex modulated optical signal in the low Q optical resonator.

In one example, the resonator of the receiver accounts for any wavefront distortion for detection without any adaptive optics and any local oscillators or mixers for measuring phase of the complex modulated optical signal.

In another example, the low Q optical resonator is further configured to convert the complex modulated optical signal to an intensity modulated signal, and the optical signal receiver further comprises a first detector coupled to an output of the low Q optical resonator via a multimode fiber cable, the first detector configured to convert the intensity modulated signal into an electrical signal, the electrical signal having an amplitude indicative of an intensity of the intensity modulated signal from the optical resonator, and that provides a detected signal, and/or a second detector coupled to an output of the third multimode fiber cable that is configured to convert the reflected optical signal into an electrical signal. In certain examples, the optical signal receiver further comprises a processor coupled to an output of the first detector that receives and processes the electrical signal from the first detector to determine information encoded in the complex modulated optical signal.

Aspects and embodiments are directed to an optical system comprising a transmitter that transmits a complex modulated optical signal, and an optical signal receiver that receives the complex modulated optical signal over the medium, the optical signal receiver including: a multimode fiber circulator including a first port, a second port, and a third port, a first multimode fiber cable coupled to the first port and having an input configured to receive the complex modulated optical signal and provide the complex modulated optical signal to the first port of the multimode fiber circulator, a second multimode fiber cable including a low Q optical resonator coupled to the second port of the multimode fiber circulator that is configured to receive the complex modulated optical signal from the second port of the multimode circulator, and a third multimode fiber cable coupled to the third port of the multimode fiber circulator that is configured to receive a reflected optical signal from the third port of the multimode circulator, the reflected optical signal being reflected from the low Q optical resonator.

In one example, the low Q optical resonator is a Fabry-Perot interferometer. According to certain examples, the Fabry-Perot interferometer is an in-line etalon. In some examples, the in-line etalon is fabricated as part of the second multimode fiber cable. In certain examples, the in-line etalon is optically bonded to the second multimode fiber cable.

In another example, the optical receiver further comprises collimating optics coupled to the input of the first multimode fiber cable.

In one example, the low Q optical resonator is configured to receive the complex modulated optical signal having a predetermined data rate and one or more symbols each having a predetermined length, wherein the predetermined length is larger than a decay time of the complex modulated optical signal in the low Q optical resonator.

In another example, the resonator of the receiver accounts for any wavefront distortion for detection without any adaptive optics and any local oscillators or mixers for measuring phase of the complex modulated optical signal.

In one example, the low Q optical resonator is further configured to convert the complex modulated optical signal to an intensity modulated signal, and the optical signal receiver further comprises a first detector coupled to an output of the low q optical resonator via a multimode fiber cable, the first detector configured to convert the intensity modulated signal into an electrical signal, the electrical signal having an amplitude indicative of an intensity of the intensity modulated signal from the optical resonator, and that provides a detected signal, and/or a second detector coupled to an output of the third multimode fiber cable that is configured to convert the reflected optical signal into an electrical signal. According to certain examples, the optical system further comprises a processor coupled to an output of the first detector that receives and processes the electrical signal from the first detector to determine information encoded in the complex modulated optical signal.

Aspects and embodiments are directed to a method of operating an optical signal receiver comprising a multimode fiber circulator including a first port, a second port, and a third port, a first multimode fiber cable coupled to the first port and having an input, a second multimode fiber cable including a low Q optical resonator coupled to the second port of the multimode fiber circulator, and a third multimode fiber cable coupled to the third port of the multimode fiber circulator, the method comprising receiving, by the first multimode fiber cable, a complex modulated optical signal and provide the complex modulated optical signal to the first port of the multimode fiber circulator, receiving, by the second multimode fiber cable, the complex modulated optical signal from the second port of the multimode circulator, and receiving, by the third multimode fiber cable, a reflected optical signal from the third port of the multimode circulator, the reflected optical signal being reflected from the low Q optical resonator.

In one example, the low Q optical resonator is a Fabry-Perot interferometer. In certain examples, the Fabry-Perot interferometer is an in-line etalon. According to some examples, the in-line etalon is fabricated as part of the second multimode fiber cable. Certain examples include the in-line etalon being optically bonded to the second multimode fiber cable.

In another example, the optical signal receiver further comprises collimating optics coupled to the input of the first multimode fiber cable.

In one example, the low Q optical resonator receives the complex modulated optical signal having a predetermined data rate and one or more symbols each having a predetermined length, wherein the predetermined length is larger than a decay time of the complex modulated optical signal in the low Q optical resonator.

In another example, the resonator of the receiver accounts for any wavefront distortion for detection without any adaptive optics and any local oscillators or mixers for measuring phase of the complex modulated optical signal.

In one example, the low Q optical resonator converts the complex modulated optical signal to an intensity modulated signal, and the optical signal receiver further comprises a first detector coupled to an output of the low Q optical resonator via a multimode fiber cable and a second detector coupled to an output of the third multimode fiber cable, the first detector converting the intensity modulated signal into an electrical signal, the electrical signal having an amplitude indicative of an intensity of the intensity modulated signal from the optical resonator, and that provides a detected signal, and/or the second detector converting the reflected optical signal into an electrical signal. In certain examples, the optical signal receiver further comprises a processor coupled to an output of the first detector, and the method further comprises the processor receiving and processing the electrical signal from the first detector to determine information encoded in the complex modulated optical signal.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral.

For purposes of clarity, not every component may be labeled in every figure. In the figures.

DETAILED DESCRIPTION

Figure 1:
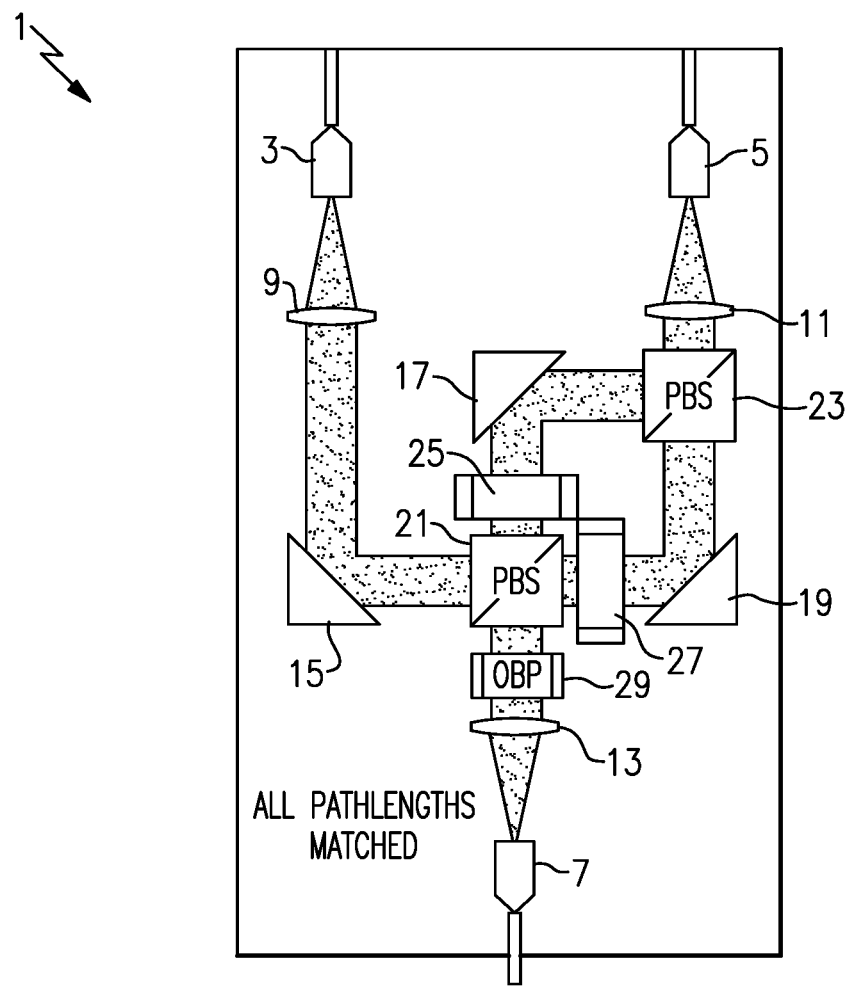
FIG. 1 is a schematic diagram of a prior art optical receiver.

It is to be appreciated that embodiments of the methods and apparatuses discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For the purposes of this disclosure, and as will be understood by those of skill in the art, the terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms light, light signal, and optical signal are not meant to imply any particular characteristic of the light, such as frequency or wavelength, band, coherency, spectral density, quality factor, etc., and may include radio waves, microwaves, infrared, visible, and/or ultraviolet electromagnetic radiation, or other electromagnetic radiation conventionally processed in the field of optics.

Traditionally for fiber and free-space optical communication, single mode fiber has been used exclusively for transporting complex, e.g., phase modulated, optical signals and adaptive optics systems are used to correct for wavefront distortion so that the incoming signal can be coupled to single mode fiber for demodulation. Such traditional optical signal detection systems for complex optical signals typically either measure the optical phase with an optical mixer with respect to a local oscillator, or with respect to the signal itself. In neither of these cases would a multimode waveguide work for transporting the complex optical signal. In the first case, the many-modes provided by a multimode waveguide would present a complex modulated optical signal with many different relative phases compared to the local oscillator, which would also acquire different phases and intensity in the mixing process, rendering such a measurement useless, and giving approximately equal output from the two ports of the mixer before and after a phase change. The alternative approach, self-mixing, requires that the path length for all modes be the same, but that situation explicitly does not hold in multimode waveguide, where modal dispersion gives each mode a different propagation constant. As a result, one could not verify that the phase coherence was maintained in multimode waveguide. A traditional etalon with a high Q would not work as a demodulator because its cavity lifetime would be too long. A high Q etalon would merely act as a filter is added to multimode fiber.

In an effort to increase throughput and spectral efficiency, Free-Space Optical (FSO) systems are moving from intensity modulation (IM) or On-Off keying (OOK) to phase modulation (PM). There is a problem with PM in that atmospheric turbulence significantly distorts the phase front of a phase modulated optical carrier. As a consequence of the requirement to mitigate the effects of atmospheric turbulence, current FSO communications systems are big, bulky, lack flexibility and are expensive. The complexity of these systems is primarily due to the adaptive optics required to mitigate the effects of atmospheric turbulence. Embodiments described herein include optical receivers that are resilient against turbulence and offers a significant reduction is size, weight, power and cost (SWaP-C).

To demonstrate the advantages of the all-fiber optical signal receivers described herein, as well as optical systems including such receivers, a prior art optical receiver generally indicated at 1 is shown in FIG. 1. The optical receiver 1 includes a first Rx port 3, a second Rx port 5, an input port 7, a first lens 9, a second lens 11, a third lens 13, a first mirror 15, a second mirror 17, a third mirror 19, a first polarizing beam splitter 21, a second polarizing beam splitter 23, a first etalon 25, a second etalon 27, and an OBP 29. The first etalon 25 and the second etalon 27 both have an etalon and a quarter waveplate coming first along the optical path. This combination allows for the polarization of the reflected wave from the etalon to be rotated by 90 degrees.

Figure 2:
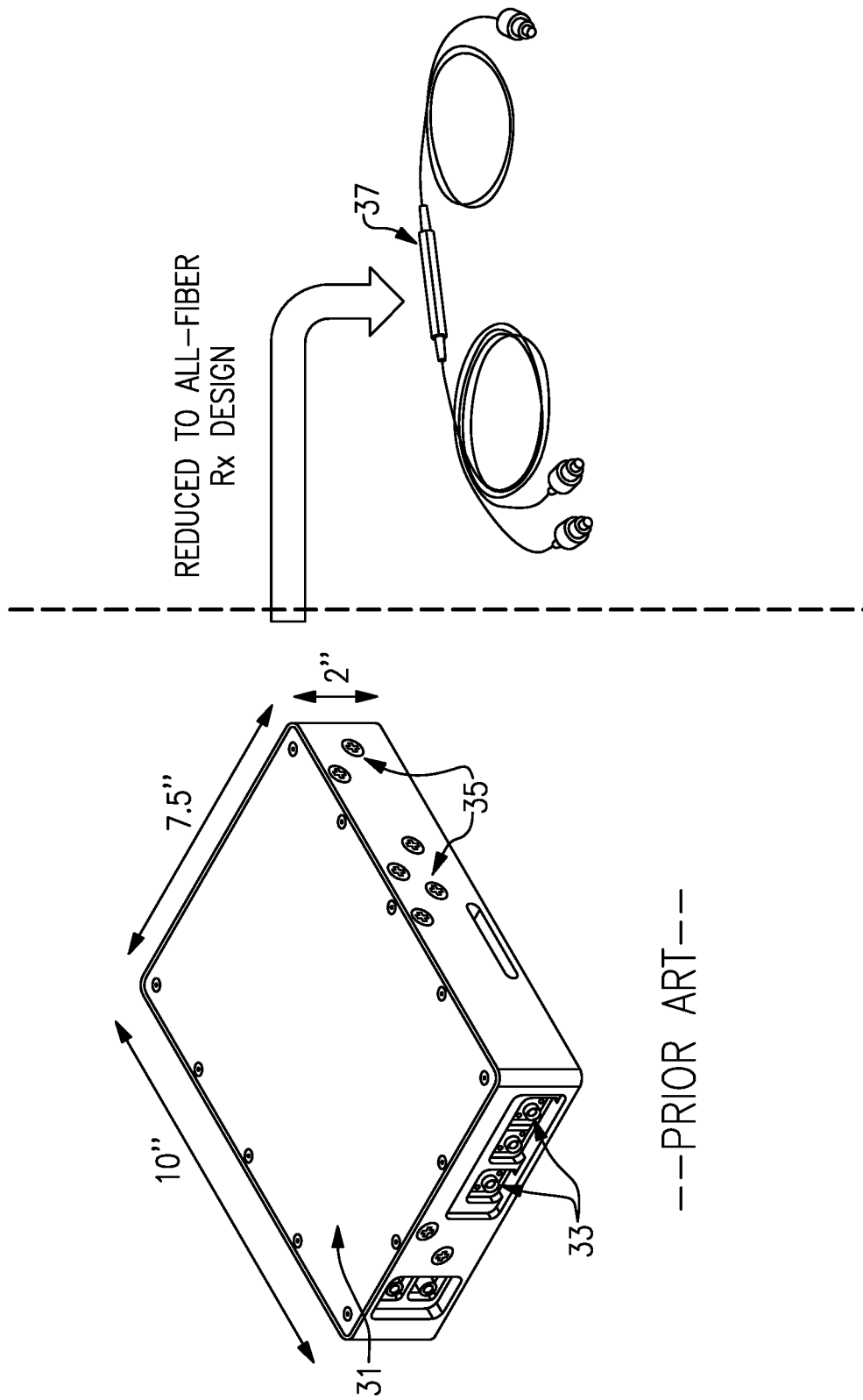
FIG. 2 is a prior art optical receiver in comparison with an all-fiber optical receiver according to aspects described herein.

The optical receiver 1 is housed in an enclosure 31 shown in FIG. 2. The enclosure measures 10 inches, by 7.5 inches, by 2 inches. The enclosure 31 includes interface ports 33 for receiving telescope input and providing output to APDs (avalanche photodiodes), and resealable access ports 35 for alignment.

Also shown in FIG. 2 is an all-fiber optical signal receiver 37 according to aspects described herein. The optical signal receiver 37 may include a multimode fiber circulator and optical resonator, such as an in-line etalon. Compared to the enclosure 31 of the optical receiver 1, the optical signal receiver 37 is about one hundred times lower in cost, about one hundred times lower in weight/size, and does not require alignment after initial fabrication. Further advantages of the all-fiber design include about a one hundred times reduction in volume, and improving stability against shock and vibration over the component based version (e.g., the optical receiver 1) while maintaining the same performance and versatility of the component based version. Details of the all-fiber optical signal receiver 37 and other all-fiber optical receivers are provided below.

In at least one example, the volume of the optical signal receiver 37, which includes at least one etalon and an optical circulator, is approximately a ¼ inch×¾ inch cylinder. The optical fibers coupled to this receiver 37 are not included in these dimensions as they are configurable in various lengths.

Bulk optical components in optical receivers have previously been used to demodulate PM signals without using adaptive optics (AO), having significant advantages over conventional AO techniques reducing SWaP-C by seven orders of magnitude. However, the all-fiber technique of embodiments described herein further reduces the SWaP-C by another three orders of magnitude making the all-fiber optical receiver suitable for applications require small form factor and/or low weight.

The all-fiber techniques disclosed herein result in optical receivers that are suitable for small unmanned aerial vehicle (UAV) and space based applications. These techniques also provide an additional two orders of magnitude reduction in manufacturing cost making the optical receiver viable for the commercial telecommunications industry.

Furthermore, producing an all-fiber design can make the optical receiver directly modular with any system with light coupled to an optical fiber. In addition, keeping light in optical fiber ensures the robustness of optical alignment in a way not possible when using individual components configured on an optical bench.

To realize an all-fiber etalon based optical receiver, for example, it is assumed that light from the atmosphere has already been coupled to a multimode fiber. The light/signal enters a multimode fiber optic circulator from a first port of the circulator, and exits the circulator through a second port. The light continues to propagate in the fiber unit reaching the etalon, which is specifically designed to demodulate the coherent signal. The etalon can be monolithically fabricated as part of the fiber, optically bonded to the fiber, tightly packaged with the fiber and collimating optics, or otherwise built to provide good coupling and alignment stability. Light transmitted through the etalon, and back into the fiber can be converted to an electrical signal through direct detection. The reflected signal from the etalon and coupled back to the fiber re-enters the circulator through the second port and is directed out through the third port. The second port signal can also be converted to an electrical signal through direct detection. To handle all possible polarization states, in certain examples, a polarization insensitive multimode fiber circulator is used.

Figure 3:
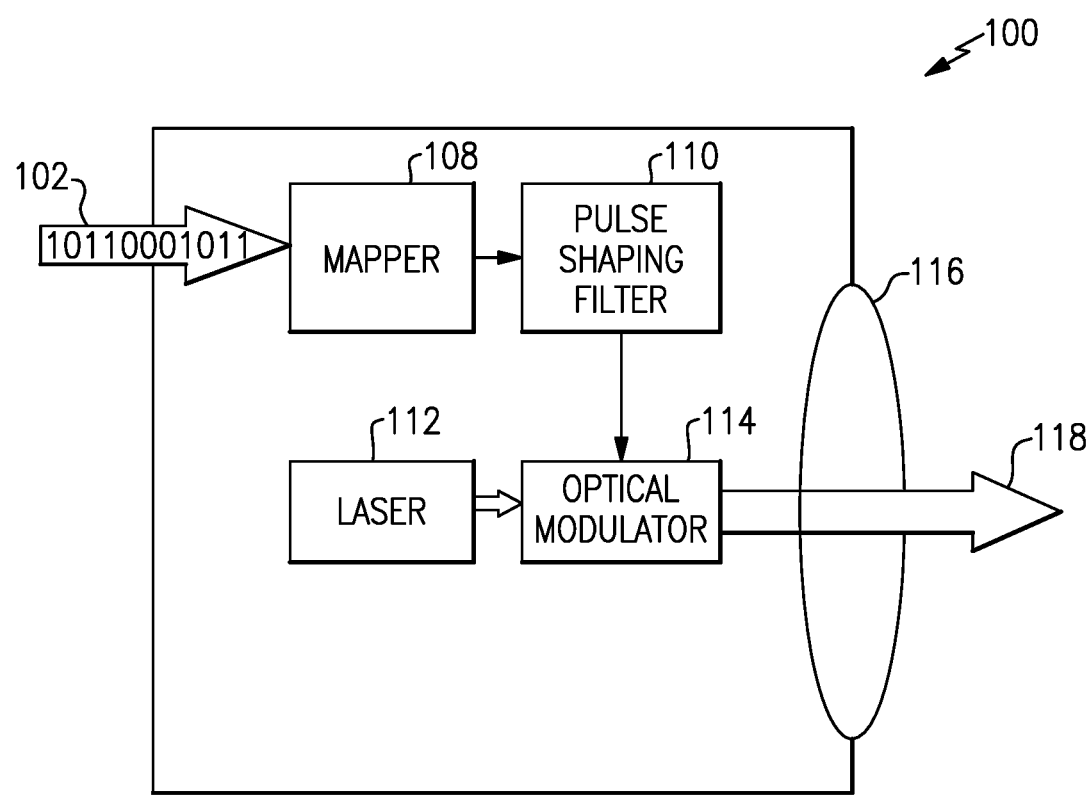
FIG. 3 is a block diagram of an optical transmitter according to aspects described herein.
Figure 4:
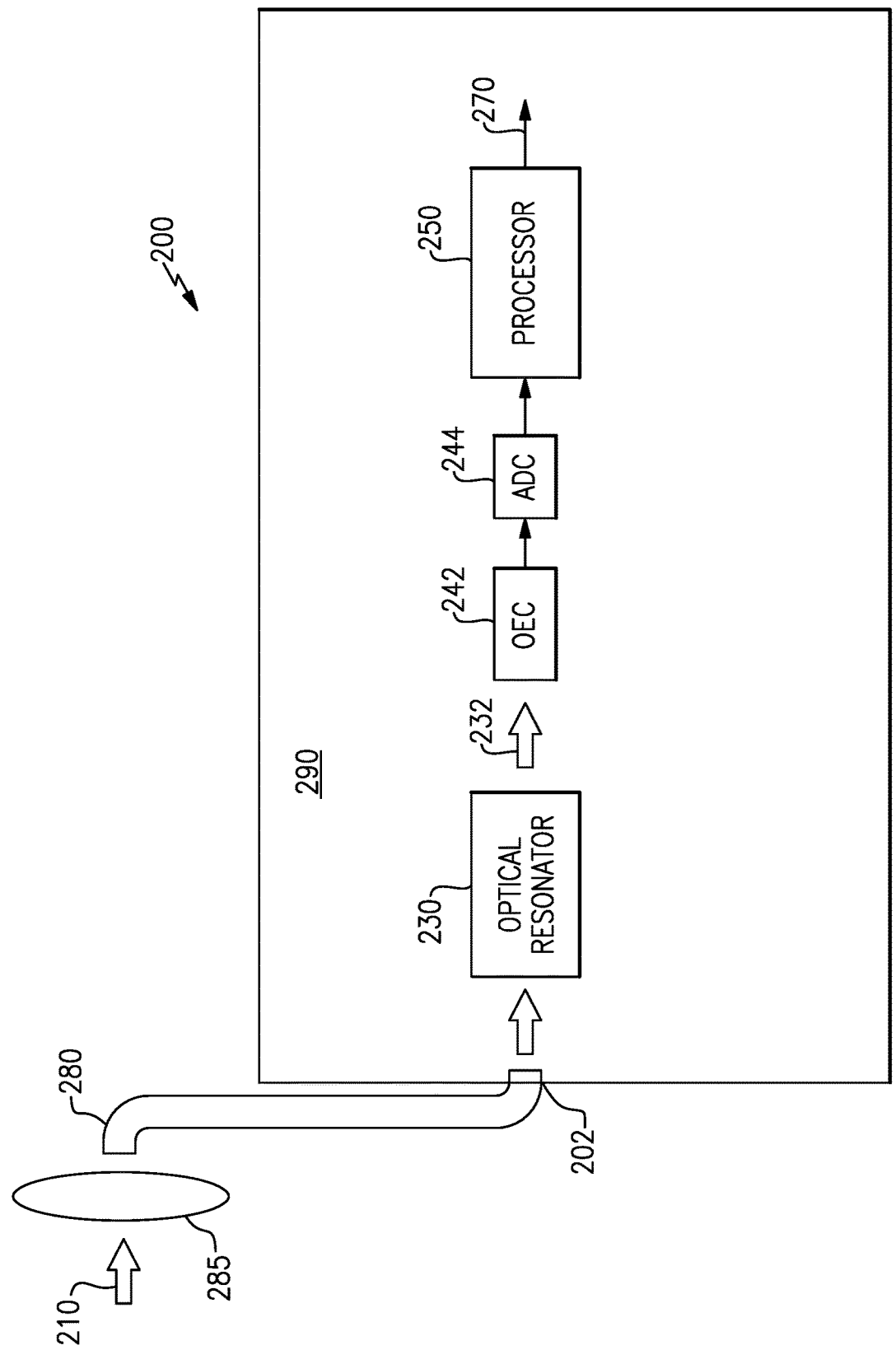
FIG. 4 is a block diagram of an optical receiver according to aspects described herein.

A functional block diagram of one example of a transmitter (e.g., optical transmitter 100) is illustrated in FIG. 3, and a functional block diagram of one example of a receiver (e.g., optical receiver 200) is illustrated in FIG. 4. The transmitter illustrated in FIG. 3 may be combined with the receiver illustrated in FIG. 4 to provide an example of a communication system, as will be readily apparent to one of ordinary skill in the art given the benefit of this disclosure.

Though the components of the example optical transmitter 100 shown in FIG. 3 and the optical receiver 200 shown in FIG. 4 may be shown and described as discrete elements in a block diagram, and may be referred to as "module", "circuitry", or "circuit," unless otherwise indicated, the components may be implemented as one of, or a combination of, analog circuitry, digital circuitry, or one or more microprocessors executing software instructions (e.g., predefined routines). In particular, the software instructions may include digital signal processing (DSP) instructions. Unless otherwise indicated, such as in the case of a multimode waveguide, signal lines between components of the optical transmitter 100 and components of the optical receiver 200 may be implemented as discrete analog, digital, or optical signal lines. Some of the processing operations may be expressed in terms of calculations or determinations by the optical transmitter 100, the optical receiver 200, a controller, or other components. The equivalent of calculating and determining values, or other elements, can be performed by any suitable analog or digital signal processing techniques and are included within the scope of this disclosure. Unless otherwise indicated, control signals may be encoded in either digital or analog form.

Referring to FIG. 3, one example of an optical transmitter 100 may include a data signal 102 source or input to receive the data signal 102, a mapping module 108, a pulse-shaping filter 110, an optical source (e.g., a laser) 112, a modulator 114, optics 116, and an output 118 to provide an optical signal output.

The mapping module 108 receives the data 102 and maps the data to a particular modulation scheme, such as various positions of a particular phase and amplitude constellation, depending upon the types of modulation used by the transmitter, e.g., phase, amplitude, frequency, or any combination of these. A pulse-shaping filter 110 may receive output of the mapping module 108 and control the modulator 114 to impose the modulation scheme on the optical source 112 to generate a modulated optical signal. In various examples, the modulator 114 may be an electro-optic modulator, and may include the optical source 112, such as a laser. In particular, the optical source 112 may emit a continuous carrier waveform that is modulated (e.g., in phase, amplitude, and/or frequency) for each symbol of the data to encode those symbols on the carrier waveform. The transmitter 100 may also include various optics 116 such as one or more mirrors or lenses to direct the optical signal at the output 118. The output 118 may direct the optical signal into free space or directly into a waveguide, for example, a multimode waveguide.

Referring to FIG. 4, illustrated is an example of an optical receiver 200 according to various examples discussed herein. FIG. 4 is described with continuing reference to the optical transmitter 100 of FIG. 3, which may communicate data to the optical receiver 200. Additionally, a receiver and a transmitter may be paired together, e.g., to form a transceiver, capable of bidirectional data communication with another transmitter/receiver pair.

The illustrated receiver 200 has an input 202 that receives an optical signal 210. The optical signal may be received from free space or from a waveguide, for example, a multimode waveguide. For example, FIG. 4 illustrates a receiver 200 in which the optical signal 210 is received by a multimode waveguide 280, optionally after being transmitted via free space and focused onto an input of the multimode waveguide 280 by a lens 285 or other optical assembly or directly transmitted by the transmitter by the multimode waveguide 280. In an example, the multimode waveguide 280 is a multimode optical fiber that is polarization insensitive. The lens 285 may be included with additional collimating optics to capture and focus the received optical signal. In an example, the lens 285 is a micro lens or a plurality of micro lenses. The receiver 200 may be remote from the input 202 and the optical signal 210 may be carried through the multimode waveguide 280 into a remote area 290, for example, a temperature controlled or otherwise environmentally controlled region housing the other portions of the receiver 200. In some embodiment, the multimode waveguide 280 itself is not a part of the receiver, but rather just the channel/medium (or portion thereof) transporting the complex optical signal 210. However, the receiver 200 (or the optical resonator 230) is configured to receive the optical signal 210 from the multimode waveguide 280.

The receiver 200 includes an optical resonator 230 and a processor or digital processing subsystem 250 that provides an output 270. The optical resonator 230 may be coupled to the processor or digital processing subsystem 250 by an optical-electrical converter 242 and an analog to digital converter 244, for example.

Examples of optical resonators 230 include Fabry-Perot etalons, bulk cavity optical resonators, or other types of optical resonators. The optical resonator 230 is a component capable of sensing transitions, such as phase variations, representative of modulation performed at the transmitter, and transforming the transitions into intensity modulation of an output optical signal, e.g., output optical signal 232. The optical resonator 230 converts the modulation of the arriving optical signal 210 in part by interaction of the arriving optical signal 210 with resonant optical energy built-up in the optical resonator 230.

For example, an etalon is a component having semi-reflective surfaces that may include a transparent material in between, and has one or more characteristic resonant frequencies, each associated with a certain wavelength of light, based upon the spacing (i.e., optical length) between the semi-reflective surfaces. The surfaces are semi-reflective and also semi-transmissive, in that they allow some light through, and therefore the arriving optical signal 210 may be allowed into the etalon and may resonate inside the etalon (i.e., between the two semi-reflective surfaces). Additionally, some of the light resonating inside is allowed out of the etalon (through the semi-transmissive surface). Light emerging from the etalon is shown, for example, as the optical signal 232 in FIG. 4.

An optical signal received by an optical resonator 230, an etalon in this example, may establish a steady-state condition in which optical signal energy continuously arrives at the etalon, accumulates or adds to built-up resonating energy existing inside the etalon, and emerges from the etalon at a constant rate. A change in the arriving phase, frequency, or amplitude of the optical signal may disrupt the resonance inside the etalon, and the light intensity emerging from the etalon is also disrupted, until a steady state condition is re-established. Accordingly, a change in phase, frequency, or amplitude of the arriving optical signal 210 causes a change in intensity of the emerging optical signal 232. A large phase transition in the arriving optical signal 210, for example, causes a large (but temporary) intensity change in the emerging optical signal 232. Accordingly, an optical resonator 230 functions as a demodulator, or a modulation converter, for an optical signal 210. The emerging optical signal 232 may therefore carry the same information content as the arriving optical signal 210, but in intensity modulated form.

The emerging intensity-modulated optical signal 232 may be converted to an electrical signal by an optical-electrical converter, e.g., OEC 242, which may include a photodetector, such as a photodiode, for example. Accordingly, the output of the OEC 242 may be an amplitude modulated signal representative of the intensity-modulated optical signal 232 and may be converted to a digital form by an analog to digital converter, e.g., ADC 244. The digital signal is provided to the digital processing subsystem 250 for digital processing. The digital processing subsystem 250 processes the digital signal to receive the information-carrying content of the optical signal 210. The basic operation of the digital processing subsystem 250 is known in the art.

In various examples, a receiver in accord with aspects and examples disclosed herein may include additional or fewer optics than discussed above and may omit or add various components relative to those discussed above. For example, focusing optics may be included to receive the emerging optical signal 232 from the optical resonator 230 and to focus the optical signal 232 either on the OEC 242 or to a multimode fiber (not illustrated) to deliver to the OEC 242. Certain examples may use analog receiver circuitry and therefore may omit one or more of the ADCs 224.

Figure 5:
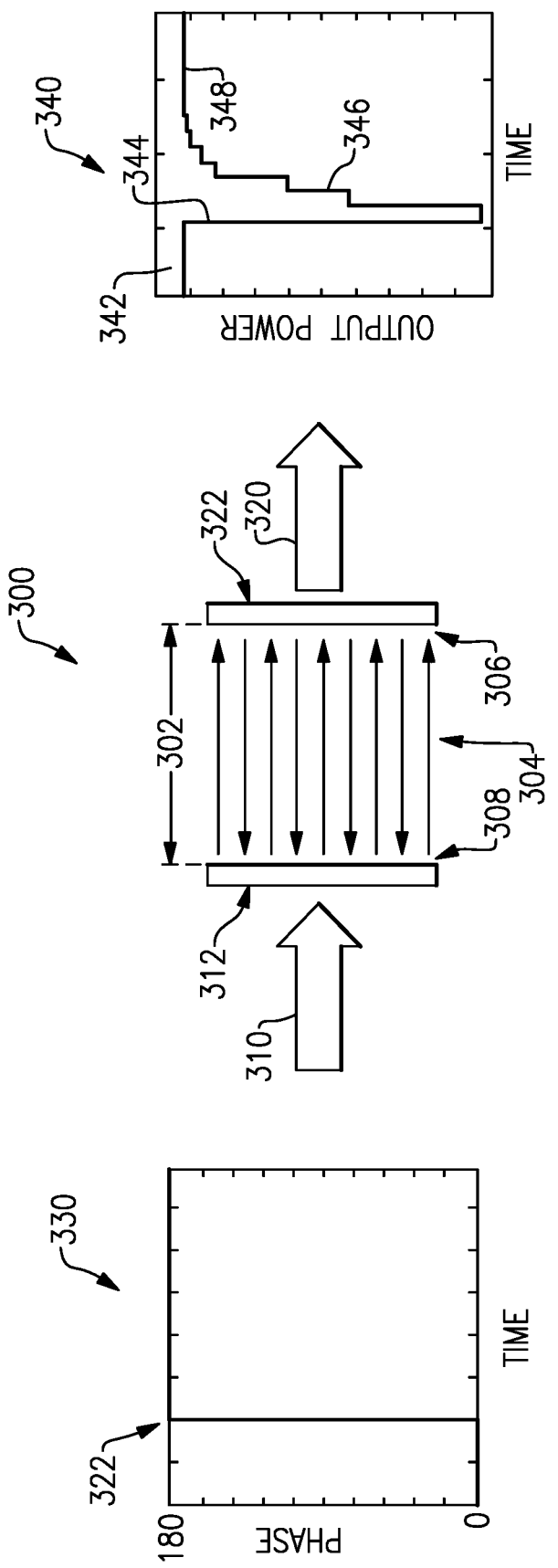
FIG. 5 is a schematic diagram of an example of an optical resonator, including a graph of received signal phase and a graph of output intensity of the optical resonator according to aspects described herein.

As discussed above, suitable optical resonators include etalons, and at least one example of an etalon is discussed with respect to FIG. 5, which illustrates an example of an etalon 300 which may be used in various examples of a receiver in accord with aspects and embodiments described herein, for example, as the optical resonator 230 in FIG. 4. In particular, a receiver may use the etalon 300 to convert complex signal modulations of a received optical communication signal 310 into intensity or amplitude modulations of an output optical signal 320. The intensity or amplitude modulated output optical signal 320 may then be converted to an electrical signal, with corresponding amplitude variations representative of the modulation of the received optical signal 310. The etalon 300 causes the received optical signal 310 to resonantly interact with itself, internal to the etalon 300, such that changes in the received optical signal 310 disrupt the resonance and cause amplitude (or intensity) variations at the output optical signal 320, which may be coupled directly to a detector.

In particular examples, the etalon 300 is designed to have a resonant frequency aligned with the source, e.g., a transmit laser, of the received optical communication signal 310. In various examples, a dimensional scale, e.g., length 302, of the etalon 300 is selected such that the etalon 300 exhibits optical resonance at the wavelength of the received optical communication signal 310. In certain examples, such dimensional scales are much shorter than the length of a transmitted symbol, which is the distance traveled by the optical signal between transitions that convey information, e.g., between phase changes in a phase modulated signal.

The etalon 300 includes an interior 304 with semi-reflective surfaces 306, 308 that reflect optical signal energy into the interior 304. An input side 312 allows optical signal energy, such as the optical communication signal 310, into the interior 304. The input side 312 thereby forms an aperture through which the arriving optical communication signal 310 is received. An output side 322 forms an optical output, at least in part by action of the semi-reflective surface 306 to allow a portion of trapped optical signal energy from the interior 304 to emerge as an output optical signal, such as the output optical signal 320. According to some aspects and embodiments the light provided at both the front and back surface of the etalon are collected as an output of the etalon and provided as output intensity modulated signals of the phase modulated input signals. Accordingly, the semi-reflective surface 306 is also semi-transmissive, such that optical signal energy arriving (from the interior 304) at the semi-reflective surface 306 is partially reflected back to the interior 304 and partially transmitted through to the output side 322.

The etalon 300 may have varying levels of reflectivity of the semi-reflective surfaces 306, 308. In certain examples, the reflectivity may be expressed as a fraction of light amplitude reflected back into the interior 304 or may be expressed as a fraction of light intensity reflected back into the interior 304. The quality factor, or Q, of an etalon having mirrors or semi-reflective surfaces such as the surfaces 306 and 308 is a useful metric for achieving the all-fiber designs disclosed herein. Thickness of the etalon 300 does not meaningfully impact Q. If the material of the etalon 300 is considered lossless, then the cavity Q is related to the reflectivity of the two end mirrors of the etalon, as well as how parallel and flat the end mirrors are. In an example of a low Q etalon, an amplitude reflectivity of the first semi-reflective surface 308 may be $r_1=0.5$ and an amplitude reflectivity of the second semi-reflective surface 306 may be $r_2=0.5$. In an example of a high Q etalon, an amplitude reflectivity of the first semi-reflective surface 308 may be $r_1=0.999$ and an amplitude reflectivity of the second semi-reflective surface 306 may be $r_2=0.985$. While a low reflectivity value generally corresponds to a low Q, at least in certain examples a high reflectivity value does not necessarily corresponds to a high Q if, for example, the cavity has other sources of loss. In at least certain examples, the cavity of the etalon 300 is generally desired to be of very low loss and the Q of the cavity is to be set by the reflectivities—both of which are generally equal in magnitude. In other examples the reflectivity of each of the first and second semi-reflective surfaces may be different and may be any suitable value for a particular implementation. The etalon 300 is one example of a suitable optical resonator in accord with aspects and embodiments described herein.

According to certain examples, an optical resonator, such as the etalon 300, will coherently develop an output signal based on the input signal, and maintain a given level of the output signal until a modulation in the phase of the input signal occurs. When a phase modulation occurs in the input signal, destructive interference causes a phase-dependent change in the amplitude of the output signal. This can be seen in the input phase plot 330 and the output power plot 340 illustrated in FIG. 5. Accordingly, a received phase encoded optical communication signal, such as received optical signal 310, is converted to an amplitude varying signal, such as the output optical signal 320, by the optical resonator, such as the etalon 300. The output optical signal 320 is suitable for direct detection by a sensor, such as the OEC 242 of FIG. 4. Additionally, an optical resonator will function over a broad range of data rates without the need to modify the optical characteristics of the system, such as detector setup, path length adjustments, delay elements, or the like. For example, the ability of the etalon 300 to convert an arriving phase modulated input optical signal 310 into an intensity modulated output optical signal 320 may be independent of the modulation rate at which the input phase is changing. For example, an output of an etalon construction is based on the magnitude and rate of phase change ($d\Phi/dt$), but independent of the data rate itself (symbols per second), as long as the steady state condition is achieved before the phase is changed again.

The use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. Etalons described herein may have, in some examples, 3 or more reflective surfaces. Additionally, etalon structures may be formed as a laminate, layer, film, coating, or the like.

FIG. 5 further illustrates operation of the etalon 300 with reference to the output power plot 340 of optical signal intensity (as output power) emerging from an optical resonator, such as the etalon 300, during a phase transition 332 in the received optical signal 310. At point 342 the etalon 300 is in a steady-state resonance condition wherein a steady intensity of light emerges. At point 344 a phase transition 332 occurs in the arriving optical signal 310, temporarily disrupting the steady-state and causing a change in the emerging light intensity. During successive reflections inside the etalon, labeled at point 346, resonance is being re-established and the emerging light intensity increases until, at point 348, a steady intensity of light emerges when the etalon 300 has returned to a steady-state condition.

Accordingly, variation in emerging light intensity from an optical resonator, such as the etalon 300, indicates that a transition occurred in an arriving optical signal, such as a phase, frequency, or amplitude variation, and such may be used by appropriate signal processing to determine useful information by analyzing the emerging light intensity. In the example discussed above and illustrated by FIG. 5, the arriving optical signal 310 is presumed to be phase modulated, but other examples include frequency or amplitude modulation, or any combination of these, and may cause similar variations or other detectable variations in output intensity. In some examples, higher order or more complex modulation may be accommodated by various optical resonator designs.

As an example, an etalon tuned to the arriving wavelength reacts to a phase variation in the arriving optical signal in accord with the discussion above and as illustrated in FIG. 5. If the arriving optical signal is modulated with binary phase shift keying (BPSK), for example, the output illustrated in FIG. 5 indicates each phase shift, and accordingly the information carried in the phase shift keying may be recovered from the intensity variations at the output optical signal 320. It should be understood by those of skill in the art with the benefit of this disclosure, that such information recovery is achieved without the necessity for a local coherent clock source or the need to support single-mode coupling, such as to a single mode fiber and delay-line interferometer, to demodulate the arriving optical signal.

In some examples, an etalon may include reflective surfaces (including semi-reflective surfaces) that are not co-planar and/or are not co-linear. For example, an interior reflective surface of an etalon may include some curvature, and an opposing surface may also be curved such that a distance between the two surfaces is substantially constant across various regions of the etalon, in some examples. In other examples, an etalon may have non-linear or non-planar surfaces with varying distances between the surfaces at various regions, and may still function as an optical resonator for various wavelengths and at various regions, suitable for use in examples discussed herein. Accordingly, an etalon may be purposefully designed to conform to a surface, or to have various regions responsive to differing wavelengths, or responsive to differing angles of arrival for a given wavelength, in certain examples.

An observation is specifically highlighted here that facilitated development of embodiments of systems using multimode optical circulators and etalons. This observation is that traditionally defined phase-modulation does not exist in multimode optical fiber. This is due to the fact that the modes propagate at different speeds, so the phase is not uniquely well defined. However, while overall optical phase is not well defined, the phase change imparted by the modulation is defined. So, if one of ordinary skill in the art were to view, for example, a disclosure of an etalon used in some combination with multimode optical fiber, such an etalon would not process a complex modulated optical signal based on phase transitions. An etalon in such context would only act as a filter, not a demodulator, and would likely have very high Q and high reflectivity parallel reflective surfaces.

According to certain embodiments, effective cavity lifetime needs to be faster than the bitrate of the communication signal. As a consequence, the light within the cavity needs to be fairly leaky and get out of the cavity quickly for the next bit to arrive. As a result, in some examples, reflectivities of etalons and other optical resonators are on the order of 50% whereas the etalons described above acting as filters, and not demodulators, have reflectivities of 99% or higher and would generally make the decay time longer than what would be useful for high speed communication.

For designing an etalon to be compatible for phase demodulation in all multimode fiber, the Q factor of the etalon is intentionally low compared to other etalon applications where the Q factor is on the order of hundreds or even thousands. In a preferred embodiment, the cavity Q is on the order of 3 to 10 and the cavity length is chosen so that the cavity lifetime with such a Q value is approximately ⅓ of the symbol duration. It is understood that these are approximate values. The symbols are communicated at a specified data rate. Data rate and the Q factor are not specifically related. In general, regardless of data rate, the Q factor is chosen to be low in order to improve functionality. The cavity lifetime takes into account the cavity Q (e.g., number of round trips before energy in the cavity drops by a certain amount) and the cavity length in order to give a cavity lifetime less (about ⅓) than the desired symbol duration.

Figure 6:
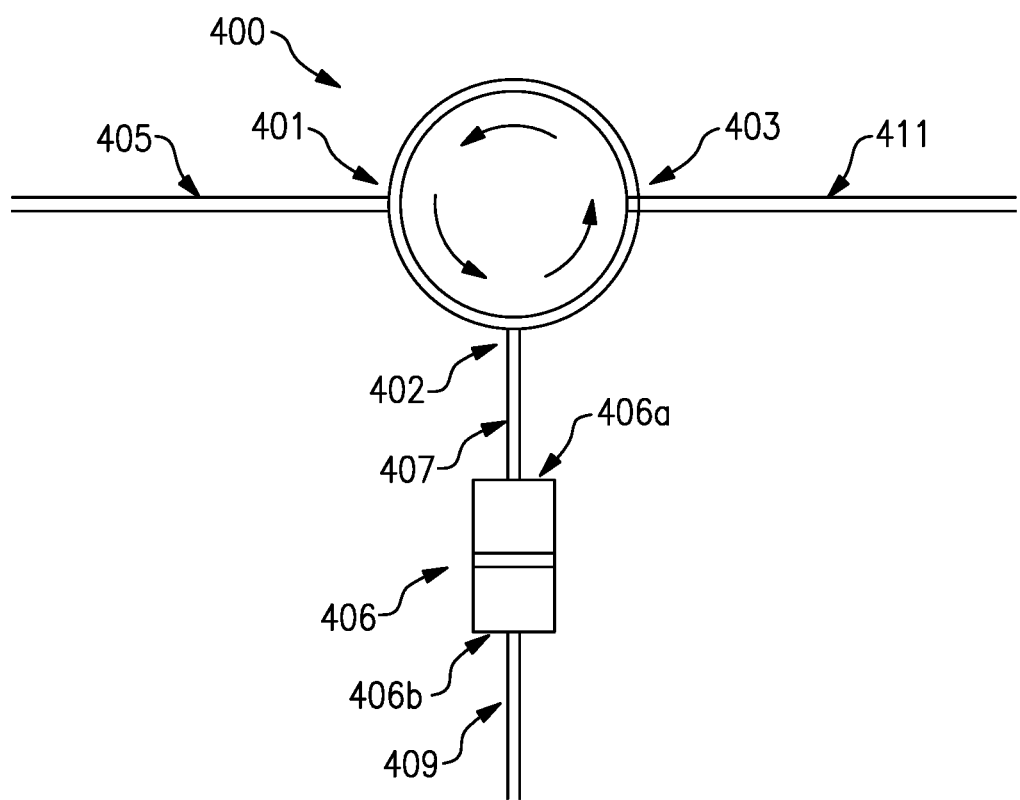
FIG. 6 is a system including a circulator and optical resonator according to aspects described herein.

FIG. 6 is a system including a multimode optical circulator generally indicated at 400 that includes a first port 401, a second port 402, and a third port 403. A first multimode fiber cable 405 is optically coupled to the first port 401. An in-line etalon generally indicated at 406 is optically coupled at a first side 406a of the etalon 406 to the second port 402 via a second multimode fiber cable 407. A third multimode fiber cable 411 is coupled to the third port 403 of the multimode optical circulator 400. A second side 406b of the in-line etalon 406 is an output of the etalon 406 that is optically coupled to a fourth multimode fiber cable 409. In examples, the fourth multimode fiber cable 409 is optically coupled to a detector that converts the intensity-modulated optical signal output by the in-line etalon 406 from the second side 406b of the etalon 406 to an electrical signal. In examples, the third multimode fiber cable 411 is optically coupled to a detector for receiving an optical signal reflected from the first side 406a of the in-line etalon 406.

Responsive to receiving a complex modulated optical signal at the first input 401 via the first multimode fiber cable 405, the complex modulated optical signal propagates in the multimode circulator 400 to the second port 402, where the optical signal then propagates to the first side 406a of the in-line etalon 406 via the second multimode fiber cable 407. Upon interacting with optical energy accumulated within the in-line etalon 406, the complex modulated optical signal is demodulated into an intensity-modulated optical signal exiting the second side 406b of the in-line etalon 406. The intensity-modulated optical signal then propagates through the fourth multimode fiber cable 409 where, in some examples, it is received by a detector that converts the intensity-modulated signal into an electrical signal. A processor may analyze the electrical signal to recover information encoded in the complex modulated optical signal.

Any of the energy of the complex modulated optical signal that is not transmitted through the in-line etalon 406 is reflected back to the second port 402 of the multimode optical circulator 400 via the second multimode fiber cable 407 and propagates to the third port 403 of the multimode optical circulator 400. The reflected optical signal then propagates through the third multimode fiber cable 411 where, in some examples, the reflected optical signal is received by a detector. In some examples, the detector converts the reflected optical signal to an electrical signal and a processor or other controller analyzes the electrical signal to determine a level of power in the reflected optical signal.

Figure 7:
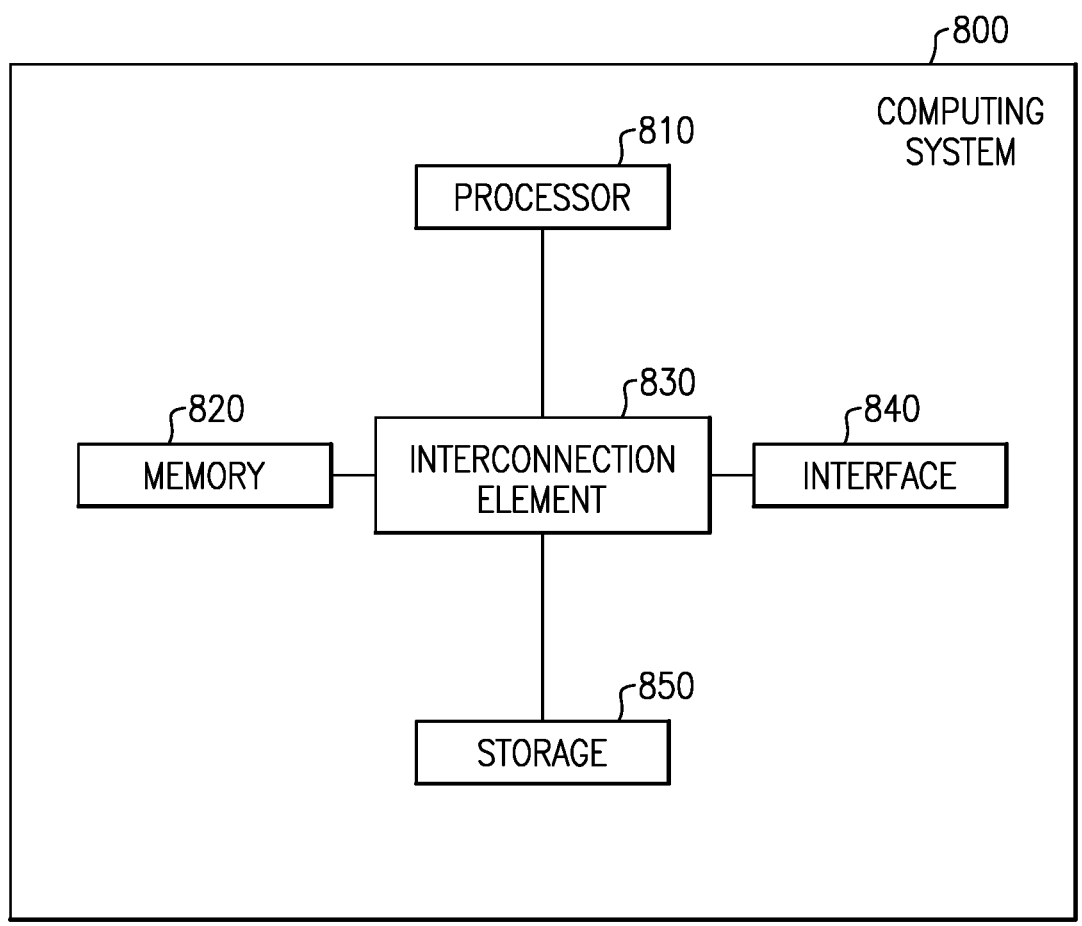
FIG. 7 is a functional block diagram of an example of a computing system according to aspects described herein.

FIG. 7 illustrates one example of a computing system 800 that may implement software routines corresponding to a control circuit or module, for example, the mapping module 108 as illustrated in FIG. 3, and/or other components. The computing system 800 may further implement software routines corresponding to the digital processing subsystem 250 of FIG. 4 and/or other components of a receiver 200. The computing system 800 may include a processor 810, data storage 850, a memory 820, and one or more interfaces 840, such as a system interface and/or a user interface. While not explicitly illustrated in FIG. 7, in certain examples the computing system 800 may be coupled to a power source. The power source may deliver power to one or more components of the computing system 800, as well as other components of the optical transmitter 100 or optical receiver 200.

In FIG. 7, the processor 810 is coupled to the data storage 850, memory 820, and the various interfaces 840. The memory 820 stores programs (e.g., sequences of instructions coded to be executable by the processor 810) and data during operation of the computing system 800. Thus, the memory 820 may be a relatively high performance, volatile, random access memory such as a dynamic random-access memory ("DRAM") or static memory ("SRAM"). However, the memory 820 may include any device for storing data, such as a disk drive or other nonvolatile storage device. Various examples may organize the memory 820 into particularized and, in some cases, unique structures to perform the functions disclosed herein. These data structures may be sized and organized to store values for particular data and types of data.

The data storage 850 includes a computer readable and writeable data storage medium configured to store non-transitory instructions and other data, and can include non-volatile storage media, such as optical or magnetic disk, ROM or flash memory. The instructions may include executable programs or other code that can be executed by the at least one processor 810 to perform any of the functions described herein.

In various examples, the computing system 800 includes several interface components 840, such as a system interface and/or a user interface. Each of the interface components 840 is configured to exchange, e.g., send or receive, data with other components of the computing system 800 (and/or associated transmitter or receiver), or other devices in communication with the computing system 800. According to various examples, the interface components 840 may include hardware components, software components, or a combination of hardware and software components.

In certain examples, components of the system interface couple the processor 810 to one or more other components of the optical transmitter 100 shown in FIG. 3, or of the optical receiver 200 shown in FIG. 4. The system interface may provide one or more control signals to any such components and may manage the operation of such components, as described above.

A user interface may include hardware and/or software components that allow a corresponding transmitter or receiver in which the computing system 800 is incorporated to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled device in communication with the computing system 800. Data received at the various interfaces may be provided to the processor 810, as illustrated in FIG. 7. Communication coupling (e.g., shown interconnection mechanism 830) between the processor 810, memory 820, data storage 850, and interface(s) 840 may be implemented as one or more physical busses in conformance with standard, proprietary, or specialized computing bus technologies.

The processor 810 performs a series of instructions that result in manipulated data that is stored in and retrieved from the data storage 850, as discussed above. In various examples, the series of instructions result in interpretation of the outputs from optical resonators as discussed above. Such instructions may correspond to commands for interpreting peaks and troughs of such output signals to determine phase, frequency, or amplitude changes (modulations) in an arriving optical signal, and/or recovering a data payload therefrom, as discussed herein.

The processor 810 may be any type of processor, multiprocessor, or controller, whether commercially available or specially manufactured. For instance, the processor may include a commercially available processor, such as a processor manufactured by INTEL, AMD, MOTOROLA, or FREESCALE. In some examples, the processor 810 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management and standard database manipulation. One or more of many operating systems may be used, and examples are not limited to any particular operating system or operating system characteristic.

Portions of the disclosure herein make reference to orders of magnitude of distance, e.g., length, and time, e.g., duration, of aspects of light signals, with regard to the length or duration of a segment of light or a wavelength of light. It is to be understood that distance and duration may at times be used interchangeably with respect to light and optical systems, and unless the context implies otherwise, the relationship between distance and duration with respect to light is the speed of light in the medium of propagation. For example, phase relationships are on the order of one wavelength of light, and a wavelength is directly inversely proportional to frequency by the speed of light in the propagation medium. Similarly, segments of light generated by modulation of a light source are on the order of the segment length, which is directly inversely proportional to modulation rate by the speed of light in the propagation medium.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. An optical signal receiver comprising:
a multimode fiber circulator including a first port, a second port, and a third port;
a first multimode fiber cable coupled to the first port and having an input configured to receive a complex modulated optical signal and provide the complex modulated optical signal to the first port of the multimode fiber circulator;
a second multimode fiber cable including a low Quality (Q) factor optical resonator coupled to the second port of the multimode fiber circulator that is configured to receive the complex modulated optical signal from the second port of the multimode circulator; and
a third multimode fiber cable coupled to the third port of the multimode fiber circulator that is configured to receive a reflected optical signal from the third port of the multimode circulator, the reflected optical signal being reflected from the low Q optical resonator;
wherein the resonator of the receiver accounts for any wavefront distortion for detection without any adaptive optics and any local oscillators or mixers for measuring phase of the complex modulated optical signal.

2. The optical signal receiver of claim 1 wherein the low Q optical resonator is a Fabry-Perot interferometer.

3. The optical signal receiver of claim 2 wherein the Fabry-Perot interferometer is an in-line etalon.

4. The optical signal receiver of claim 3 wherein the in-line etalon is fabricated as part of the second multimode fiber cable.

5. The optical signal receiver of claim 3 wherein the in-line etalon is optically bonded to the second multimode fiber cable.

6. The optical signal receiver of claim 1 further comprising collimating optics coupled to the input of the first multimode fiber cable.

7. The optical signal receiver of claim 1 wherein the low Q optical resonator is configured to receive the complex modulated optical signal having a predetermined data rate and one or more symbols each having a predetermined length, wherein the predetermined length is larger than a decay time of the complex modulated optical signal in the low Q optical resonator.

8. The optical signal receiver of claim 1 wherein the low Q optical resonator is further configured to convert the complex modulated optical signal to an intensity modulated signal, and the optical signal receiver further comprises:
a first detector coupled to an output of the low Q optical resonator via a multimode fiber cable, the first detector configured to convert the intensity modulated signal into an electrical signal, the electrical signal having an amplitude indicative of an intensity of the intensity modulated signal from the optical resonator, and that provides a detected signal; and/or
a second detector coupled to an output of the third multimode fiber cable that is configured to convert the reflected optical signal into an electrical signal.

9. The optical signal receiver of claim 8, further comprising a processor coupled to an output of the first detector that receives and processes the electrical signal from the first detector to determine information encoded in the complex modulated optical signal.

10. An optical system comprising:
a transmitter that transmits a complex modulated optical signal; and an optical signal receiver that receives the complex modulated optical signal over the medium, the optical signal receiver including:
a multimode fiber circulator including a first port, a second port, and a third port;
a first multimode fiber cable coupled to the first port and having an input configured to receive the complex modulated optical signal and provide the complex modulated optical signal to the first port of the multimode fiber circulator;
a second multimode fiber cable including a low Quality (Q) factor optical resonator coupled to the second port of the multimode fiber circulator that is configured to receive the complex modulated optical signal from the second port of the multimode circulator; and
a third multimode fiber cable coupled to the third port of the multimode fiber circulator that is configured to receive a reflected optical signal from the third port of the multimode circulator, the reflected optical signal being reflected from the low Q optical resonator;
wherein the resonator of the receiver accounts for any wavefront distortion for detection without any adaptive optics and any local oscillators or mixers for measuring phase of the complex modulated optical signal.

11. The optical system of claim 10 wherein the low Q optical resonator is a Fabry-Perot interferometer.

12. The optical system of claim 11 wherein the Fabry-Perot interferometer is an in-line etalon.

13. The optical system of claim 12 wherein the in-line etalon is fabricated as part of the second multimode fiber cable.

14. The optical system of claim 12 wherein the in-line etalon is optically bonded to the second multimode fiber cable.

15. The optical system of claim 10 wherein the optical receiver further comprises collimating optics coupled to the input of the first multimode fiber cable.

16. The optical system of claim 10 wherein the low Q optical resonator is configured to receive the complex modulated optical signal having a predetermined data rate and one or more symbols each having a predetermined length, wherein the predetermined length is larger than a decay time of the complex modulated optical signal in the low Q optical resonator.

17. The optical system of claim 10 wherein the low Q optical resonator is further configured to convert the complex modulated optical signal to an intensity modulated signal, and the optical signal receiver further comprises:
a first detector coupled to an output of the low q optical resonator via a multimode fiber cable, the first detector configured to convert the intensity modulated signal into an electrical signal, the electrical signal having an amplitude indicative of an intensity of the intensity modulated signal from the optical resonator, and that provides a detected signal; and/or
a second detector coupled to an output of the third multimode fiber cable that is configured to convert the reflected optical signal into an electrical signal.

18. The optical system of claim 17 further comprising a processor coupled to an output of the first detector that receives and processes the electrical signal from the first detector to determine information encoded in the complex modulated optical signal.

* * * * *